United States Patent
Suzuki et al.

(10) Patent No.: US 11,836,407 B2
(45) Date of Patent: Dec. 5, 2023

(54) INFORMATION PROCESSING APPARATUS AND CONTROL METHOD THEREOF, AND NON- TRANSITORY COMPUTER-READABLE STORAGE MEDIUM

(71) Applicant: CANON KABUSHIKI KAISHA, Tokyo (JP)

(72) Inventors: Tomohiro Suzuki, Kanagawa (JP); Kouta Murasawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/051,694

(22) Filed: Nov. 1, 2022

(65) Prior Publication Data

US 2023/0161527 A1 May 25, 2023

(30) Foreign Application Priority Data

Nov. 22, 2021 (JP) .................................. 2021-189621

(51) Int. Cl.
*G06F 3/12* (2006.01)

(52) U.S. Cl.
CPC .......... *G06F 3/1253* (2013.01); *G06F 3/1205* (2013.01); *G06F 3/1285* (2013.01)

(58) Field of Classification Search
CPC ..... G06F 3/1253; G06F 3/1205; G06F 3/1285
See application file for complete search history.

(56) References Cited

U.S. PATENT DOCUMENTS

| 6,480,913 | B1 * | 11/2002 | Monteiro | G06F 7/768 |
| | | | | 710/33 |
| 9,533,492 | B2 | 1/2017 | Murasawa | |
| 9,815,274 | B2 | 11/2017 | Murasawa | |
| 2003/0081255 | A1 * | 5/2003 | Shimizu | H04N 1/46 |
| | | | | 358/1.13 |
| 2011/0001999 | A1 * | 1/2011 | Nanaumi | H04N 1/4433 |
| | | | | 358/1.14 |
| 2011/0286683 | A1 * | 11/2011 | Hori | H04N 9/73 |
| | | | | 382/276 |
| 2012/0307312 | A1 * | 12/2012 | Shimada | B41J 2/2132 |
| | | | | 358/2.1 |

(Continued)

FOREIGN PATENT DOCUMENTS

JP 2019-211849 A 12/2019

*Primary Examiner* — Helen Zong
(74) *Attorney, Agent, or Firm* — VENABLE LLP

(57) ABSTRACT

A control method for controlling an information processing apparatus configured to generate print data using a first program that is interpreted and executed when operating in the information processing apparatus and a second program that is compiled in advance and is usable from the first program, includes acquiring a first generation logic for generating print data, the first generation logic being modifiable and linked with a printer configured to execute printing; generating a second generation logic by modifying the first generation logic at least partially; generating print data to be printed by the printer using input image data and the second generation logic; and transmitting, to the printer, the print data generated in the generating the print data. The first generation logic is executed using the second program.

13 Claims, 8 Drawing Sheets

(56) References Cited

U.S. PATENT DOCUMENTS

| | | | |
|---|---|---|---|
| 2015/0363173 A1* | 12/2015 | Kurokawa | G06F 3/1205 |
| | | | 717/115 |
| 2019/0354324 A1* | 11/2019 | Kakitsuba | G06F 3/1204 |
| 2019/0372980 A1* | 12/2019 | Nakamura | H04L 67/01 |
| 2020/0226752 A1* | 7/2020 | Lee | G06T 5/005 |
| 2022/0129715 A1* | 4/2022 | Kuo | G06K 15/1881 |
| 2022/0303539 A1* | 9/2022 | Tang | H04N 19/17 |
| 2023/0032207 A1* | 2/2023 | Fukuoka | G06F 3/1206 |

* cited by examiner

FIG. 9

| | | | |
|---|---|---|---|
| 0x0000 (1) | 0xa SIGN OF START | | ~903 |
| 0x0001 (1) | TYPE OF COMPRESSION (0:NO COMPRESSION, 1:SHIFT COMPRESSION, 2:HUFFMAN CODE,...) | | |
| 0x0002 (4) | IMAGE WIDTH | | |
| 0x0006 (4) | IMAGE HEIGHT | | |
| 0x0010 (4) | Number OF DATA of C INK | | |
| 0x0014 (4) | Number OF DATA of M INK | | |
| 0x0018 (4) | Number OF DATA of Y INK | | |
| 0x0022 (4) | Number OF DATA of K INK | | |
| 0x0026 | ACTUAL DATA OF C INK ~906 | | |
| 0x00XX | ACTUAL DATA OF M INK ~907 | | |
| 0x00XX | ACTUAL DATA OF Y INK ~908 | | |
| 0x00XX | ACTUAL DATA OF K INK ~909 | | |
| 0x00XX (1) | 0xa SIGN OF END OF DATA | | |

| | |
|---|---|
| 0x0000 (1) | xa SIGN OF START |
| 0x0001 (1) | TYPE OF COMPRESSION (0:NO COMPRESSION, 1:SHIFT COMPRESSION, 2:HUFFMAN CODE,...) |
| 0x0002 (4) | IMAGE WIDTH |
| 0x0006 (4) | IMAGE HEIGHT |
| 0x0010 (4) | Number OF DATA of C INK |
| 0x0014 (4) | Number OF DATA of M INK |
| 0x0018 (4) | Number OF DATA of Y INK |
| 0x0022 (4) | Number OF DATA of K INK |
| 0x0026 | ACTUAL DATA OF C INK (1st LINE) |
| 0x00XX | ACTUAL DATA OF M INK (1st LINE) |
| 0x00XX | ACTUAL DATA OF Y INK (1st LINE) |
| 0x00XX | ACTUAL DATA OF K INK (1st LINE) |
| 0x00XX | ACTUAL DATA OF C INK (2nd LINE) |
| 0x00XX | ACTUAL DATA OF M INK (2nd LINE) |
| 0x00XX | ACTUAL DATA OF Y INK (2nd LINE) |
| 0x00XX | ACTUAL DATA OF K INK (2nd LINE) |
| ⋮ | |
| 0x00XX (1) | 0xa SIGN OF END OF DATA |

910

INFORMATION PROCESSING APPARATUS AND CONTROL METHOD THEREOF, AND NON- TRANSITORY COMPUTER-READABLE STORAGE MEDIUM

BACKGROUND OF THE INVENTION

Field of the Invention

The present invention relates to an information processing apparatus and a control method thereof, and a non-transitory computer-readable storage medium.

Description of the Related Art

In recent years, many individuals own smartphones, and it is taken for granted that printer vendors provide print applications for smartphones to users. Using such a print application, each user can transmit image data such as JPEG image data from the smartphone to a printer, and the printer can generate print data from the received image data and print it.

Print data generation processing of such a printer includes a lot of processes such as image data decoding, color space conversion, ink color separation, and quantization. The number of inks in the printer, the ink characteristic, the internal operation accuracy, and the like change depending on the printer, and these are individually optimized. These control operations are done by the firmware (FW) of the printer, and executed using an application specific integrated circuit (ASIC) together in print data generation processing. If the ASIC is used, high-speed processing can be executed at low cost.

In addition to the ASIC processing, a method of generating print data by a print driver on a host side can also be used. The print driver is mainly used in a PC and has many advantages a print application does not have, for example, a spool function and a capability of designating fine print settings.

The above-described print data generation processing by the print application or the print driver is conventionally provided by each printer vendor. However, there are many demands for individually customizing print data generation processing. If print data generation processing can be customized, the user can create a print product preferred by himself/herself. For a printer vendor that commercially handles print products, customization is expected to increase originality of products and competitive power.

To customize the above-described print data generation processing, it is necessary to modify the print application, modify the FW/ASIC, or modify the print driver. As the print application or the print driver, a built program is used, and this cannot be modified by the user. Also, the FW or ASIC is not configured to be rewritten by the user, and it is difficult for the user to modify it at hand. Hence, customization of print data generation processing needs to be performed by the printer vendor. However, it is not realistic for the printer vendor to do customization for each user because of a large load.

As a means for solving this, print data generation processing is dynamically modified on a host device.

For the above-described dynamic modification of print data generation processing, a script language such as JavaScript® is suitably used. However, the logic of the script language is readily analyzed as compared to a program compiled in advance, and providing the logic by the script language is not preferable from the viewpoint of technology protection or security. In addition, since interpretation processing by an interpreter is executed at the time of execution, the processing speed of the script language is lower than a program compiled in advance. For this reason, a web application often uses a method of using processing in a host device and processing in a server together.

SUMMARY OF THE INVENTION

The present invention provides a technique of, on an information processing apparatus side, dynamically modifying generation of print data to be printed by a printer and enabling print data generation in a state in which original print data generation processing is also usable.

According to an aspect of the present invention, there is provided a control method for controlling an information processing apparatus configured to generate print data using a first program that is interpreted and executed when operating in the information processing apparatus and a second program that is compiled in advance and is usable from the first program, comprising: acquiring a first generation logic for generating print data, the first generation logic being modifiable and linked with a printer configured to execute printing; generating a second generation logic by modifying the first generation logic at least partially; generating print data to be printed by the printer using input image data and the second generation logic; and transmitting, to the printer, the print data generated in the generating the print data, wherein the first generation logic is executed using the second program.

Further features of the present invention will become apparent from the following description of exemplary embodiments (with reference to the attached drawings).

BRIEF DESCRIPTION OF THE DRAWINGS

FIG. 9 is a view for explaining the data format of print data transmitted from the information processing apparatus according to the embodiment to the printer; and FIG. 10 is a view for explaining another data format of print data transmitted from the information processing apparatus according to the embodiment to the printer.

DESCRIPTION OF THE EMBODIMENTS

Figure 1:
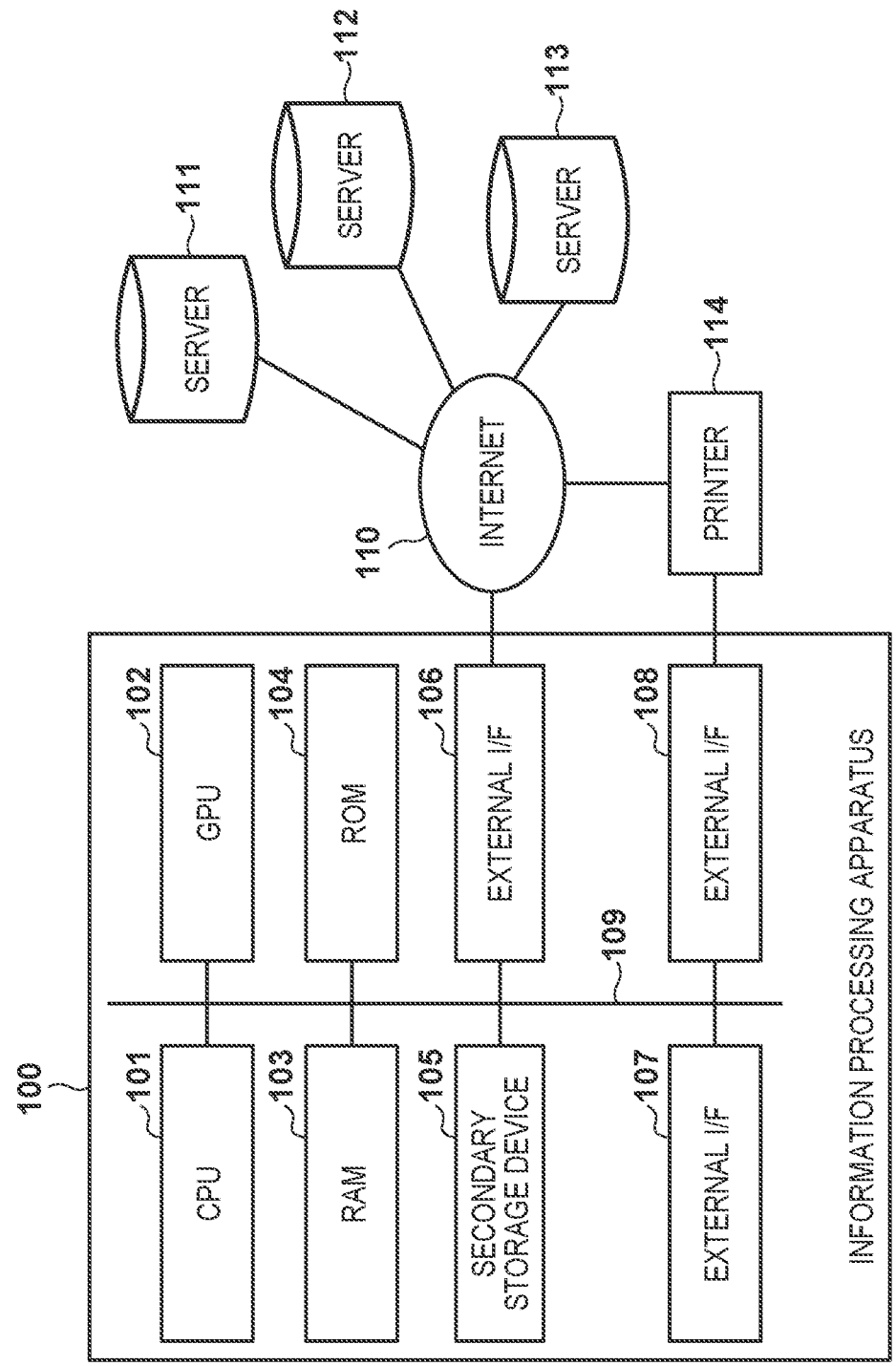
FIG. 1 is a block diagram showing an example of connection between the hardware configuration of an information processing apparatus according to the embodiment of the present invention and external apparatuses.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

FIG. 1 is a block diagram showing an example of connection between the hardware configuration of an information processing apparatus 100 according to the embodiment of the present invention and external apparatuses.

The information processing apparatus 100 includes a central processing unit (CPU/processor) 101, a Graphics Processing Unit (GPU) 102, a RAM 103, a ROM 104, a secondary storage device 105, and external I/Fs 106 to 108. The information processing apparatus 100 is connected to the Internet 110 via the external I/F 106 and is also connected to a printer 114 via the external I/F 108. Servers 111 to 113 are connected to the Internet 110.

The CPU 101 executes various kinds of processing to be described below in accordance with programs. Note that the CPU 101 includes one CPU in FIG. 1 but may be formed by a plurality of CPUs or CPU cores. The GPU 102 is an operation device capable of performing parallel processing of an enormous amount of operations. The GPU 102 is generally good at performing calculations necessary for 3D graphic or image drawing and is recently applied to machine learning as well. The RAM 103 functions as a work memory that includes an area to expand a program stored in the ROM 104 or the secondary storage device 105 and temporarily stores various kinds of information when the CPU 101 executes a program. The ROM 104 stores programs that the CPU 101 expands on the RAM 103 and executes. The secondary storage device 105 is a storage device including, for example, a hard disk or a flash memory, and stores files, data of databases holding processing result of image analysis and the like, and various kinds of programs. Each of the external interfaces (I/Fs) 106 to 108 is an interface having at least one of a wired communication mode and a wireless communication mode and communicates with external devices (the printer 114 or the servers 111 to 113) in accordance with the communication form used. Examples of wired communication are an USB and Ethernet®, and examples of wireless communication are a wireless LAN, NFC, Bluetooth®, and infrared communication. If a wireless LAN is used as wireless communication, there are a form in which devices are directly connected to each other and a form in which devices are connected via a relay device such as a wireless LAN router. If the information processing apparatus 100 is an apparatus such as a desktop PC, which does not have a display function or an input mechanism, a keyboard, a display, a pointing device, or the like is connected to the external I/F 107 and used. Mutual communication between various kinds of constituent elements in the information processing apparatus 100 is performed via a control bus/data bus 109.

The printer 114 is a printing apparatus, and transmits/receives data to/from the information processing apparatus 100 via the external I/F 108 of the information processing apparatus 100. Also, the information processing apparatus 100 is connected to the Internet 110 via the external I/F 106.

Figure 2:
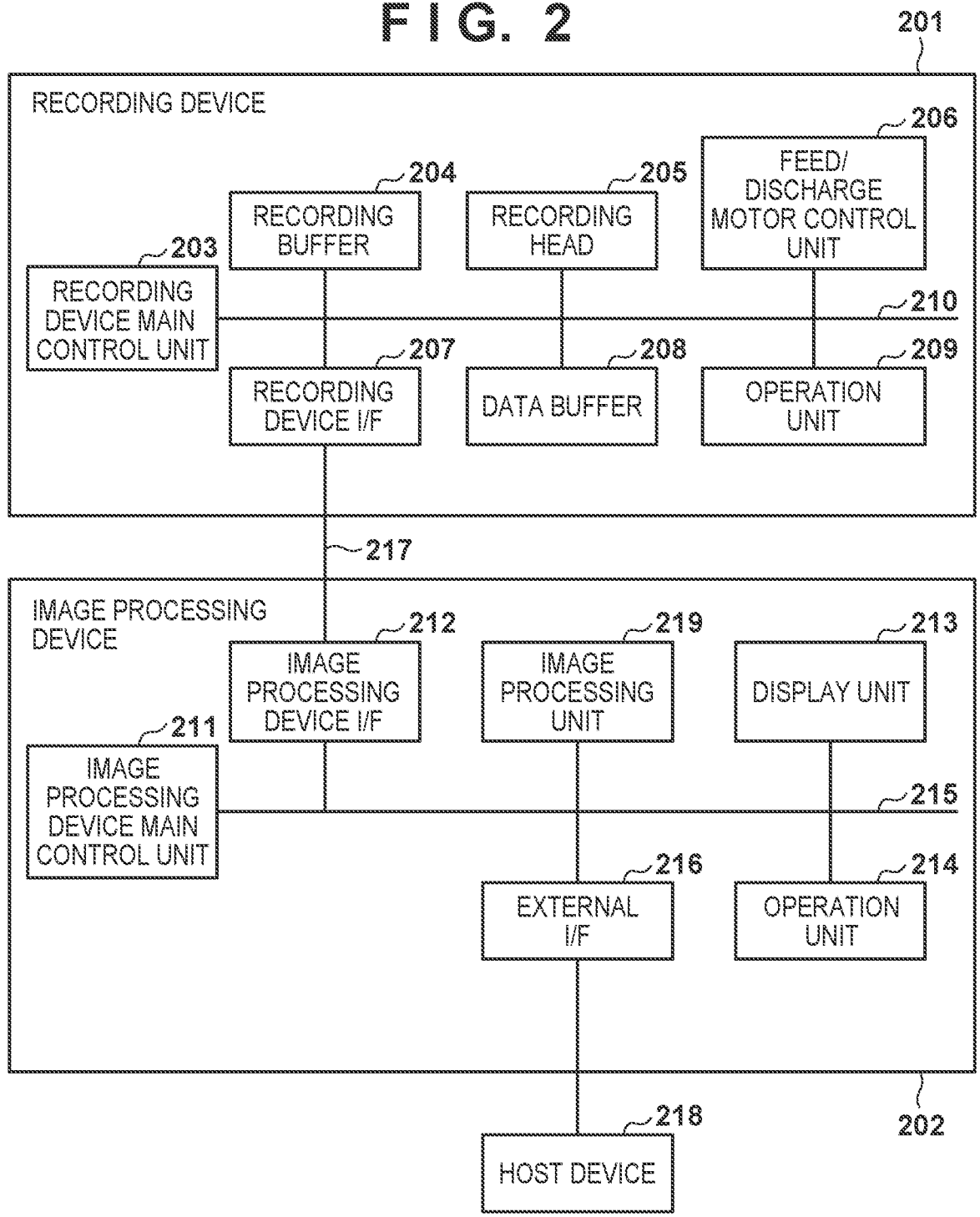
FIG. 2 is a block diagram for explaining the functional configuration of a printer according to the embodiment.

FIG. 2 is a block diagram for explaining the functional configuration of the printer 114 according to the embodiment.

The printer 114 according to the embodiment includes a recording device 201 and an image processing device 202 as roughly divided functions. Image data supplied from the information processing apparatus 100 undergoes predetermined image processing by the image processing device 202 and is then sent to the recording device 201 and recorded (printed).

In the recording device 201, a main control unit 203 of the recording device controls the entire recording device 201 and includes a CPU, a ROM, a RAM, and the like. A recording buffer 204 stores, as raster data, image data before transfer to a recording head 205. The recording head 205 is an inkjet-type recording head including a plurality of recording elements capable of discharging ink as droplets, and discharges ink from each recording element in accordance with the image data stored in the recording buffer 204. Recording element arrays of four colors including cyan (C), magenta (M), yellow (Y), and black (K) are arranged on the recording head 205. However, the number of colors is not limited to this. For example, recording elements of light cyan, light magenta, gray, and the like are sometimes mounted in addition to the four colors. As spot color inks, recording elements of red, green, and blue inks and fluorescent color inks may be mounted. Also, recording elements of silver ink, emboss ink, clear ink, and the like, which have functions other than colors, may be mounted. The recording elements may be formed by recording elements of a single black color.

If the amount of data accumulated in the recording buffer 204 is smaller than the amount of data processed by the recording head 205, the operation of the recording head stops, resulting in unevenness. To prevent this, the speed of storing raster data in the recording buffer 204 needs to be made higher than the speed of the recording head 205 recording based on data. As another measure, recording is started after raster data is accumulated such that data is not exhausted from the recording buffer 204 until the end of recording.

A feed/discharge motor control unit 206 controls conveyance and feed/discharge of a recording medium such as a sheet or paper and controls a paper position such that ink discharged from the recording head 205 lands at a correct position om the paper surface. The start/stop operation of a conveyance motor is executed in consideration of a case where the recording head 205 has a multi-pass configuration.

A recording device I/F 207 transmits/receives data signals to/from the image processing device 202. An I/F signal line 217 connects these. As for the type of FF signal line 217, for example, an FF signal line with specifications of Centronics can be applied. A data buffer 208 temporarily stores image data received from the image processing device 202. An operation unit 209 includes a mechanism configured to perform a command operation by a developer. A system bus 210 connects the functional units of the recording device 201.

The image processing device 202 will be described next. A main control unit 211 of the image processing device is configured to generate, based on image data supplied from an external I/F 216, print data that can be recorded by the recording device 201, and includes a CPU, a ROM, a RAM, and the like. The main control unit 211 also returns corresponding data in response to a request from the external I/F. For example, lookup tables and matrices necessary for generating image data, which are used by the image processing device 202, are recorded in advance in the ROM of the main control unit 211 of the image processing device. An image processing device I/F 212 transmits/receives data signals to/from the recording device 201. The external I/F 216 transmits/receives image data or the like to/from an information processing apparatus such as a host device. A display unit 213 displays various kinds of information to the user, and, for example, a liquid crystal display unit or the like can be applied. An operation unit 214 is a mechanism used by the user to perform a command operation and includes, for example, a keyboard, a pointing device, and the like. A system bus 215 connects the main control unit 211 to each functional unit.

An image processing unit 219 performs image processing. Image data input via the external I/F 216 includes image data such as JPEG or PNG data that cannot be recorded by the recording device 201. The image processing unit 219 executes decoding, CMYK conversion, and the like for these data, thereby generating print data that can be recorded by the recording device 201. The thus generated print data is transmitted to the recording device 201 via the image processing device I/F 212.

The information processing apparatus 100 according to the embodiment will be described below.

Figure 3:
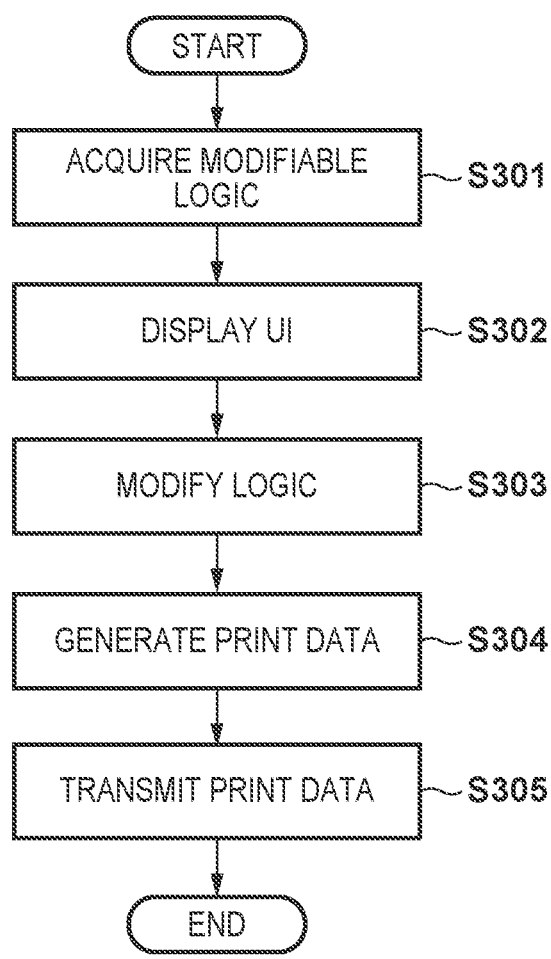
FIG. 3 is a flowchart for explaining processing of the information processing apparatus according to the embodiment generating print data and transmitting it to the printer.

FIG. 3 is a flowchart for explaining processing of the information processing apparatus 100 according to the embodiment generating print data and transmitting it to the printer 114. Note that the processing shown in the flowchart is achieved by the CPU 101 executing a program expanded on the RAM 103.

First, in step S301, the CPU 101 acquires a logic that can be modified. Using a browser 401 (FIG. 4) mounted in the information processing apparatus 100, the logic is acquired, by an http protocol, from the printer 114 connected via the external I/F 108.

Figure 4:
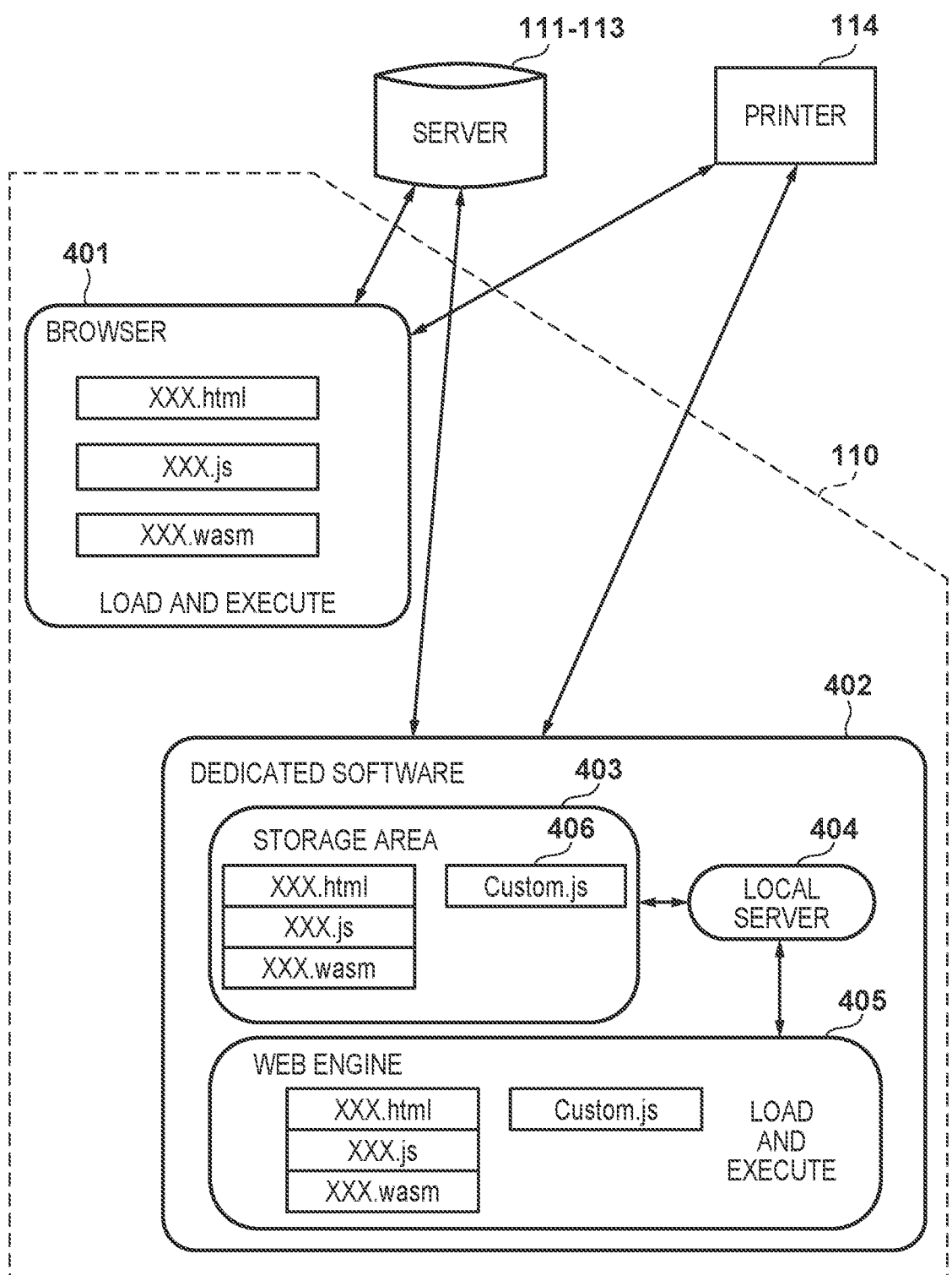
FIG. 4 is a view for explaining an example in which the information processing apparatus according to the embodiment acquires data from the printer or a server.

FIG. 4 is a view for explaining an example in which the information processing apparatus 100 according to the embodiment acquires data from the printer 114 or a server.

The browser 401 and dedicated software 402 are executed by the information processing apparatus 100. In response to a query from the browser 401, the printer 114 returns an HTML file, a JavaScript file, and a WASM (WebAssembly) file. The HTML file includes a description concerning the UI of an application and is used to construct a UI together with JavaScript. The JavaScript file is a program described by a script language called JavaScript. A logic for dynamically modifying a file is described in the JavaScript file, and processing can partially be modified using the logic. Note that the JavaScript file acquired here is not compiled. When executing the JavaScript file, it is compiled in the information processing apparatus 100. That is, the logic created by JavaScript is compiled in the information processing apparatus 100 at the time of execution of the application and executed by the CPU 101. Note that normal browsers including the browser 401 include a JavaScript engine, and JavaScript is dynamically compiled by the JavaScript engine at the time of execution. The WASM file is the logic of print data generation processing to be executed in the printer 114. The same print data generation processing as the processing in the printer 114 is executed on the browser 401 by executing the WASM file. Also, in the present invention, the WASM file is a program compiled in advance before acquired by the information processing apparatus 100. More specifically, the WASM file compiled in advance is held by the printer 114, and the information processing apparatus 100 acquires the WASM file. Note that the WASM file held by the printer 114 may be a file compiled the printer 114 or may be a file compiled by an external server. In the present invention, the WASM file is an instruction set described by WebAssembly. Note that the WASM file can be used from the JavaScript file.

Communication processing in the printer 114 is controlled by the main control unit 211 of the image processing device. In this embodiment, files returned from the printer 114 to the information processing apparatus 100 are an HTML file, a JavaScript file, and a WASM file. However, the files are not limited to these. Any communication protocol usable by the browser 401 can be used, and the communication is not limited to http communication. For example, security of communication may be increased using https, or communication may be speeded up using WebSocket.

In the embodiment, a query is output from the browser 401 to the printer 114, and the file that describes the print data generation logic linked with the printer 114 is acquired. However, the file acquisition is not limited to this. For example, the file may be received from the servers 111 to 113, and client software that outputs the file request may be the dedicated software 402. If data is received from the servers 111 to 113, print data generation processing can be modified even if the printer main body does not exist at hand.

If the dedicated software 402 is used, client software can be described by Native. It is therefore possible to use an arbitrary communication protocol that is not usable by the browser. Additionally, if a file acquired by performing communication once is stored in a storage area 403 (secondary storage device 105), a print data generation processing modification operation can be performed without communication with the server from the second time. Furthermore, processing after the logic is modified may be stored as a custom file 406 and used. If the dedicated software 402 is used, an internal local server 404 is executed to load the file from the storage area 403. A web engine 405 executes processing by interpreting JavaScript or the like. If the web engine 405 is incorporated, like the dedicated software 402, the influence of version change of the browser 401 can be eliminated.

Next, the process advances to step S302, and the CPU 101 displays a UI. The display of the UI may be done on an external display connected via the external I/F 106 or the like. For example, in a smartphone, the UI is displayed on a touch panel display mounted on the smartphone.

Figure 5A:
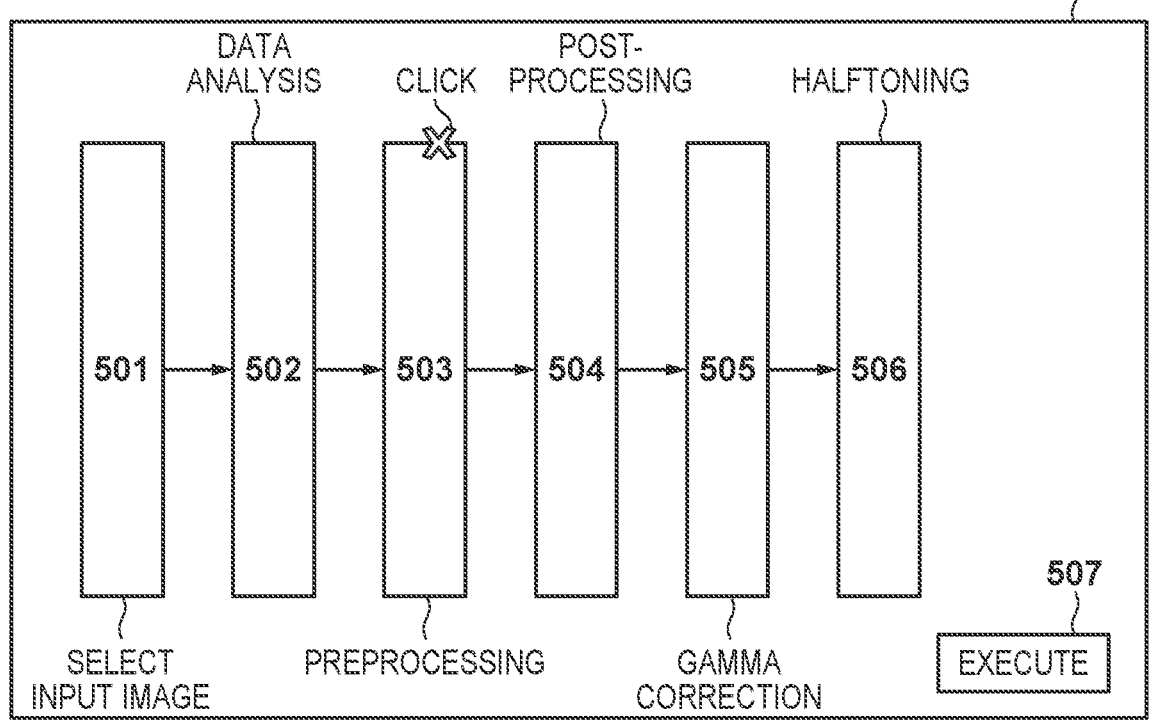
FIG. 5A is a view showing an example of a main flow screen displayed by UI display in step S302.

FIG. 5A is a view showing an example of a main flow screen displayed by UI display in step S302.

In the UI display according to the embodiment, a main flow screen 500 is displayed. On the main flow screen 500, blocks 501 to 506 showing the procedures and items of print data generation processing and an execution button 507 configured to finally instruct printing execution are displayed. The user can select an arbitrary item from the main flow screen 500 and modify the print data generation processing.

Next, the process advances to step S303. Upon receiving, from the user, the instruction for modifying print data generation processing, the CPU 101 modifies the logic of the print data generation processing in accordance with the instruction of the user. The UI blocks 502 to 506 correspond to print data generation processes 602 to 606 shown in FIG. 6, respectively. The print data generation processes including processes 607 and 608 will be referred to as "processing blocks" hereinafter. Note that the print data generation processes are not limited to the print data generation processes 602 to 606.

Figure 6:
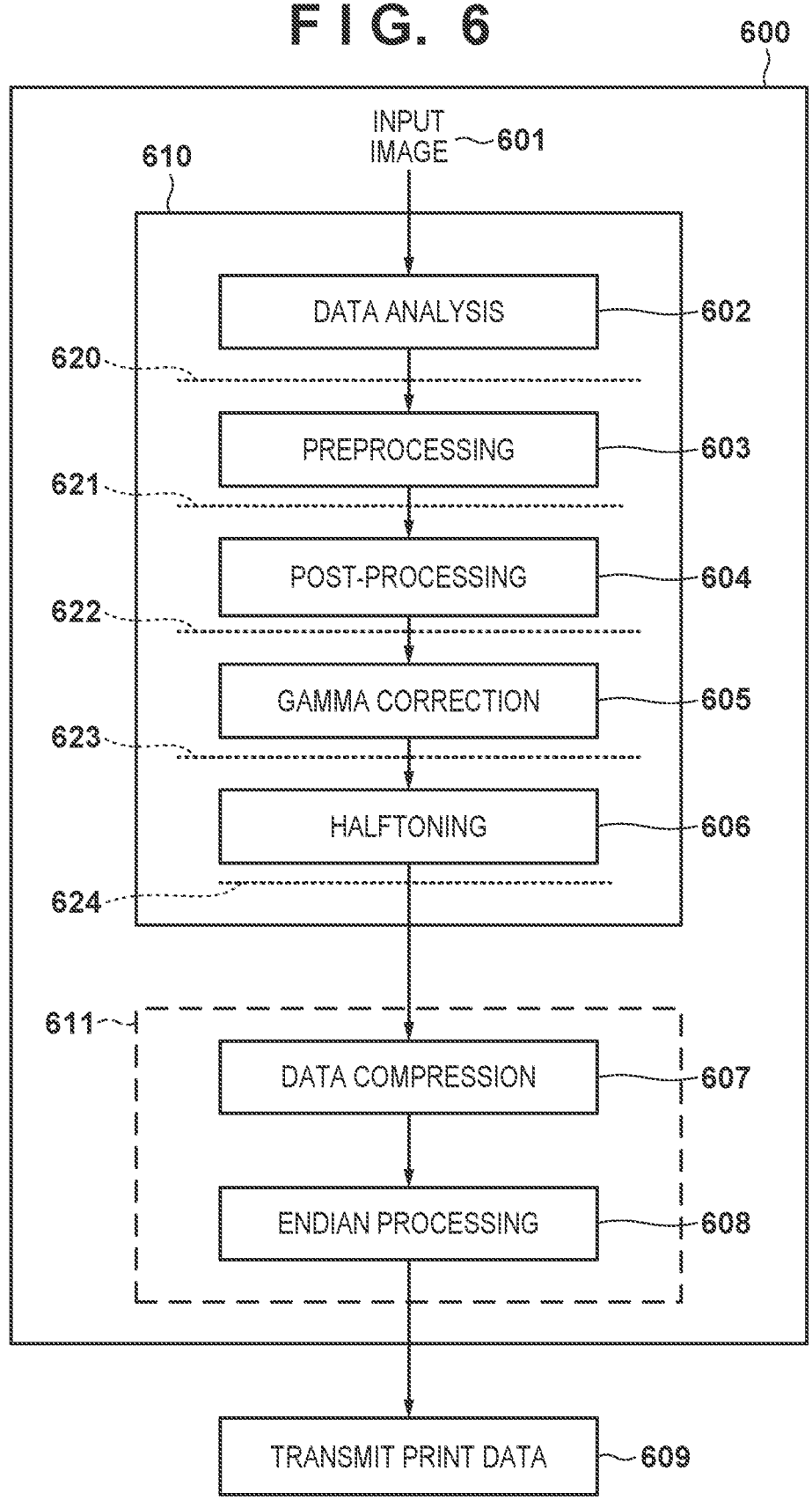
FIG. 6 is a view for explaining the procedure of processing of the information processing apparatus according to the embodiment from generation of print data to its transmission.

FIG. 6 is a view for explaining the procedure of processing of the information processing apparatus 100 according to the embodiment from generation of print data to its transmission. The print data generation processing blocks 602 to 606 correspond to the blocks 502 to 506 in FIG. 5A, respectively.

The entire system operating on the host device including the print data generation processing blocks 602 to 608 and the UI will be referred to as a "print data generation framework" 600 hereinafter. Here, a processing block group 610 (602 to 606) is a processing block which is presented to the user on the UI and to which the user can give an instruction of modification of the like. A processing block group 611 (607 and 608) is a processing block which is not presented to the user and is processed by the print data generation framework 600. The processes of the processing block group 611 are provided by WASM from the printer 114, and the processes may be put in one WASM file or may be provided by a plurality of WASM files. That is, providing can be done by any form if a usable logic compiled in advance is provided.

An input image 601 is input image data that is the processing target of print data generation processing. The input image 601 is acquired by the user clicking the input image selection block 501 on the main flow screen 500 shown in FIG. 5A. As for the Image data acquisition, image data can be acquired from a file in the host device using an <input> tag in HTML. Alternatively, an image file can be acquired from the outside via the Internet 110 using a fetch function of JavaScript. The image data thus selected by the input image selection block 501 and input is decoded, and expanded to 24-bit data with 8 bits for each of RGB before input to the data analysis 602. The image data is held in the following format.

```
let image = {
    width: the width of the image
    height: the height of the image
    channels: 3 // 3 channels of RGB
    depth: 8    // operation accuracy. if 16 bits, 16
    data: image data
    colorSpace: "AdobeRGB"
}
```

Data analysis 602 is a portion to which image data is transferred first in print data generation processing, and image data is analyzed.

An inkjet printer does not use a method of mixing CMY (cyan, magenta, and yellow) inks to print a black region. This is because the method of mixing CMY inks can theoretically obtain black, but technically, it is difficult to reproduce black. Another reason is the method consumes more ink for three colors, and it is more reasonable to use black ink (K). Hence, black (K) ink is generally used in a black region. The black region here is, for example, a character region in a document. Some documents include only black characters, and some documents include drawings inserted. In such a document, appropriately separating regions to eject CMY inks and regions to eject K ink can improve image quality or reduce the consumption of inks (recording materials). A portion for performing region separation is the data analysis 602, and this has a role of analyzing character regions in an image and regions other than the character regions and storing the analysis result as data. The data is stored in the RAM 103. If a dedicated application is used, the data may be stored in the secondary storage device 105. After the data analysis 602 is executed, error check 620 is performed next. If no error is detected here, the process advances to preprocessing 603.

In the preprocessing 603, the data input by RGB is changed, and RGB data is output. Here, for example, to modify the preprocessing 603, the user clicks the preprocessing block 503 on the main flow screen 500. If the preprocessing block 503 is clicked, a preprocessing editing screen 510 shown in FIG. 5B is displayed.

Figure 5B:
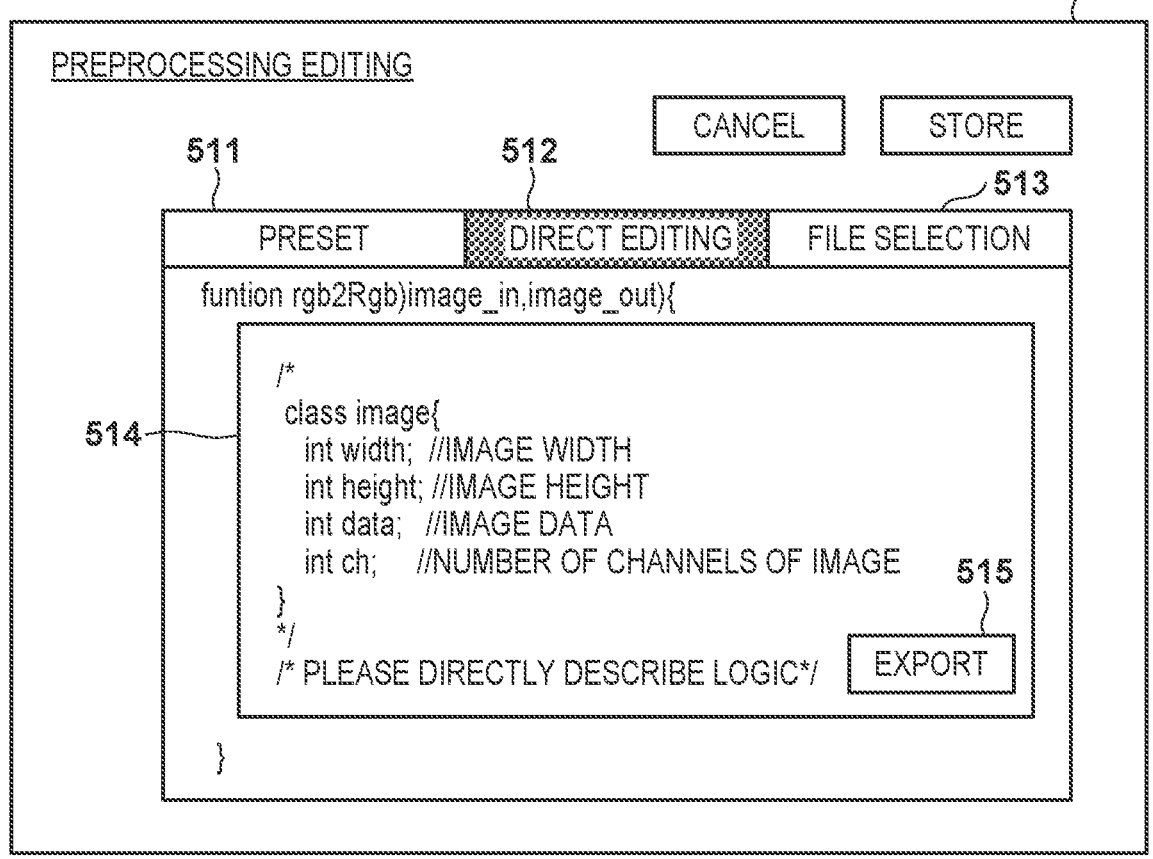
FIG. 5B is a view showing an example of a preprocessing editing screen displayed by clicking the preprocessing block shown in FIG. 5A.

FIG. 5B is a view showing an example of the preprocessing editing screen 510 displayed by clicking the preprocessing block 503 shown in FIG. 5A.

On the preprocessing editing screen 510, one of three types of print data generation processes can be selected and designated. Here, one of a preset button 511, a direct editing button 512, and a file selection button 513 can be selected by a click.

The preset button 511 can select a process from a plurality of preset processes. These preset processes are acquired at the timing of accessing the printer 114 in step S301 described above. An example of preprocessing is color space conversion.

Generally, each pixel of digital data of an image is formed by RGB data each of which is expressed by 8 bits. In this case, the minimum value is 0, and the maximum value is 255. For example, (R, G, B)=(0, 0, 0) represents black, and (R, G, B)=(0, 255, 0) represents green. 255 is the maximum value of 8-bit data and, for example, (R, G, B)=(0, 255, 0) represents the maximum output of green.

On the other hand, there are various types of displays for displaying image data, and the color expression capability changes therebetween. Here, assume that there are a display A having a high green expression capability and a display B having a low green expression capability. In this case, if (R, G, B)=(0, 255, 0) is displayed, although the digital data is the same, it does not appear as the same color to the human eye. More specifically, this is, for example, a case where the display A is an AdobeRGB monitor, and the display B is an sRGB display. That is, it is impossible to express the same color to the human eye across displays by simply setting identical 8-bit data for each of RGB. The difference of expression can be reduced by the color space and color space conversion processing. The color space indicates the range (gamut) of expressible colors, and there exist sRGB, AdobeRGB, DisplayP3, and the like. If the color space and RGB data are combined and stored as image data, colors can be made close to the same color even across the displays. This conversion processing is called color space conversion.

When selecting a process from a plurality of preset processes, for example, color space conversion processing from sRGB to the printer color space (DeviceRGB), color space conversion processing from AdobeRGB to the printer color space, and the like are prepared as the preset processes. The preset processes are not limited to the above-described color space conversion and may also include, for example, processing of increasing brightness, edge enhancement processing, and smoothing processing, and a plurality of processes may be selected from these.

The direct editing button 512 enables directly editing of a program in JavaScript. If the direct editing button 512 is pressed, an editing region 514 is displayed as shown in FIG. 5B. Via the editing region 514, the user can implement a process to be executed. Since processing is dynamically compiled in JavaScript, a configuration for overwriting processing later, as in the embodiment, is possible.

In the editing region 514, data to be input to the preprocessing 603, the explanation of each data, and data to be output are displayed. The user describes a program based on these pieces of information. When modifying the preprocessing 603, all processes may be replaced, or a situation where a method of adding a new process to the original preprocessing should be employed is also assumed. To cope with such a situation, a means for executing a WASM file concerning the preprocessing 603, which is acquired from the printer 114, is provided simultaneously. Processing modification includes not only modifying or adding a process, as described above, but also skipping all processes.

In editing by the direct editing button 512, a function that can be described in JavaScript and used in JavaScript can be used. For example, if API such as WebGL is used, processing by a GPU is possible, and print data generation processing after the modification can be expected to be speeded up.

If the file selection button 513 is pressed, modification of print data generation processing can be implemented by loading an external file. The file to be loaded at this time has, as a condition, a description according to a specific rule, and enables loading of a processing logic based on the rule. For example, an overwrite function used to overwrite a processing block on the print data generation framework 600 is prepared, and an external file always invokes the overwrite function as the specific rule. The specific rule is not limited to this, as a matter of course.

Thus, if print data generation processing can be modified by loading an external file for defining a processing logic, convenience can be improved such that processing generated once can be used many times, or a file prepared by a third party can be used. As for the external file generation, a file generated by editing using the direct editing button 512 may be exported in accordance with pressing of an export button 515. Since the browser 401 can use WASM, JavaScript and WASM may be loaded, and the loaded WASM file may be used as the external file. C/C++ and RUST which are programming languages capable of generating WASM can describe parallel processing, and if these are used, speed-up by parallel processing can be expected.

The conversion method of the preprocessing 603 according to this embodiment has been described above. Here, RGB data input of 8-bit accuracy is expanded to RGB data of 10-bit accuracy by preprocessing. Also, the user converts the AdobeRGB color space into DeviceRGB that is the color space of the printer 114 by unique processing by editing using the direct editing button 512 and simultaneously performs expansion processing from 8 bits to 10 bits. The number of bits of image data is increased here to raise the operation accuracy, and an actual printer often performs an operation at an accuracy of 8 bits or more. As the method of increasing the number of bits, a precomputed bit accuracy may be set, as described above. Alternatively, since operation accuracy is information specific to a printer, it may be decided by inquiring of the printer 114 about the internal operation accuracy. If the operation accuracy is increased from 8 bits to 10 bits, the user handles pixel values not within the range of 0 to 255 but within the range of 0 to 1023. According to the above-described image format, the format of image data transferred from the preprocessing 603 to the post-processing 604 is as follows.

```
image = {
    width: the width of the image
    height: the height of the image
    channels: 3
    depth: 10        // operation accuracy of 10 bits
    data: image data // Uint16Array
    colorSpace: "DeviceRGB"
}
```

Here, when transferring the image data from the preprocessing 603 to the post-processing 604, the print data generation framework 600 performs error check 621 for the preprocessing. In this embodiment, 10-bit image data is transferred to the post-processing 604. Data with more bits is unexpected for the print data generation framework 600. Hence, in the error check 621, it is confirmed whether the image data transferred from the preprocessing 603 to the post-processing 604 is adaptive to 10 bits or less. Here, the type of data of the image format is defined by a 16-bit type (Uint16Array).

Figure 7:
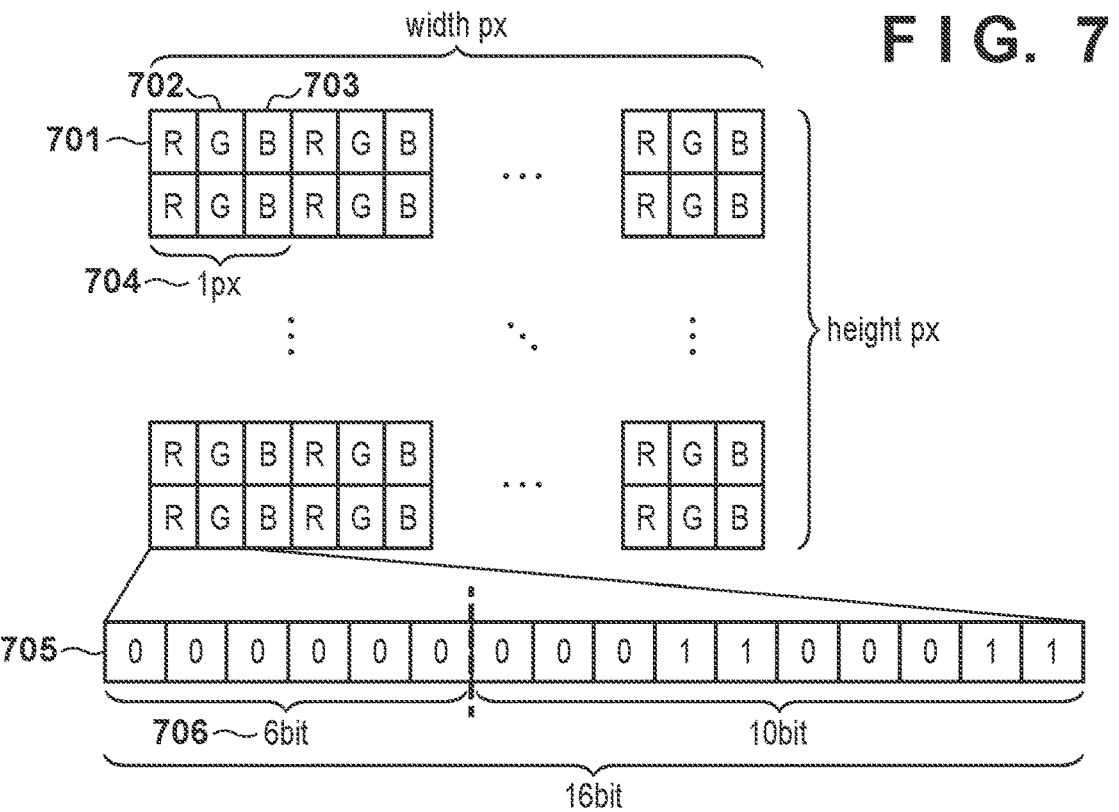
FIG. 7 is a view for explaining image data and the number of bits to be handled in the embodiment.

FIG. 7 is a view for explaining image data and the number of bits to be handled in the embodiment.

Referring to FIG. 7, each of R 701, G 702, and B 703 of one pixel 704 holds an area 705 capable of handling 16 bits (2 bytes). In the embodiment, a 6-bit area indicated by a reference numeral 706 is not used. 10-bit data can take a value from 0 to 1023, and the maximum value is 1023. In the embodiment, however, since JavaScript processes data in a 16-bit type, a value of 1024 or more can be set in actuality. Placing focus on this, what the error check 621 should do is to check whether a value larger than 1023 is included in the image data transferred from the preprocessing 603. Another error check may include confirming whether channels of image data is 3, depth is 10, and colorSpace is DeviceRGB.

As described above, not only the value of image data but also the contents of the image format are confirmed, thereby making the user be conscious of the output of each processing block, which is intended by the print data generation framework 600. As a notification made when an error is detected by each of the error checks 620 to 624 shown in FIG. 6, the error may be thrown by a function of JavaScript and displayed in a log, or an error dialogue may be displayed on the UI.

Note that in the embodiment, Uint16Array of JavaScript has been described as an example. However, the present invention is not limited to this, as a matter of course, and a negative value or a fractional value may be used. In this case, a range according to the value is checked.

The post-processing 604 to halftoning 606 in FIG. 6 can also be modified by the user, like the preprocessing 603. Each processing block will be described assuming that the logic is not modified by the user after the preprocessing 603.

The post-processing 604 is a processing block for converting RGB data into CMYK data. In a PC or a smartphone, image data is handled as RGB. Since the screens of these devices have a light emitting capability, colors are expressed by additive color mixture of RGB. On the other hand, since a print product by a printer does not emit light, colors are expressed by subtractive color mixture. In the subtractive color mixture, CMY data are necessary for expressing colors. In the printer 114, black (K) ink is added to the CMY inks, and printing is performed by CMYK. That is, since the data finally needed for printing is data concerning CMYK, RGB data needs to be converted into CMYK data at a certain timing. In the embodiment, this is performed by the post-processing 604. For example, an example of equations for converting RGB data into CMYK data is as follows.

$K = (1023 - \max(R, G, B));$ $C = (1023 - R - K)/(1023 - K);$ $M = (1023 - G - K)/(1023 - K);$ $Y = (1023 - B - K)/(1023 - K);$ where max is a function for acquiring a maximum value from a given argument.

However, the above-described processing is not actually used. This is because a printed color greatly changes depending on not only CMYK data but also the characteristics of inks mounted in the printer 114, the mechanical accuracy of the printer 114 itself, and an ink ejection place by halftoning. Hence, the processing of converting RGB data into CMYK data in the post-processing 604 is a portion that is uniquely made by each printer vendor.

However, there is room for the user to make customization here as well. For example, in the post-processing 604, after RGB data is converted into CMYK data by executing processing based on the modifiable print data generation logic acquired from the printer 114, the amount of the CMYK data may be halved. If the amount of CMYK data is halved, the ink discharge amount is simply decreased. Hence, this is preferable for the user who wants to reduce ink consumption even if the density is low. Also, for example, if the remaining amount of C ink is small as the result of inquiring of the printer 114, the data amount of C of the CMYK data can be decreased to put off runout of cyan ink.

In a cartridge called an integrated ink cartridge in which inks and the recording head are integrated, CMY inks are included in one cartridge. At the timing when one of the color inks has run out, the cartridge needs to be exchanged. If the values of CMY data are customized, the ink use amounts can be made even, and the cartridge exchange cycle can be prolonged.

Here, the image format transferred from the post-processing 604 to the gamma correction 605 is as follows.

```
image = {
    width: the width of the image
    height: the height of the image
    channels: 4    // CMYK
    depth: 10      // the operation accuracy is 10 bits
    data: image data   // Uint16Array
    colorSpace: "DeviceCMYK"
}
```

In the gamma correction 605, gamma correction for the CMYK data is executed.

In the post-processing 604, RGB data is converted into CMYK data, and values of 0 to 1023 are stored. Here, 0 is a value representing that no ink is ejected at all, and 1023 is a value representing that the ink discharge amount is maximum. Even if the amount of ink to be discharged is controlled in correspondence with the values of 0 to 1023, the color density does not increase in proportion to the discharge amount. If ink is ejected to blank white paper, it is possible to visually recognize that the density gradually increases. However, if the color saturates to some extent, the degree of density increase lowers even if the same amount of ink is ejected. Various factors such as the human visual characteristic, the characteristic of ink, and the DPI (Dots Per Inch) of the printer can be considered. In the processing of the gamma correction 605, adjustment is performed in consideration of these factors. For example, CMYK data are changed as follows.

$\gamma = 2.2;$ $C = 1023 * \text{pow}(1.0 - (C/1023), \gamma);$ $M = 1023 * \text{pow}(1.0 - (M/1023), \gamma);$ $Y = 1023 * \text{pow}(1.0 - (Y/1023), \gamma);$ $K = 1023 * \text{pow}(1.0 - (K/1023), \gamma);$ where pow(a, b) is a function of raising $a$ to the power of b.

The user who has modified the post-processing 604 can edit the gamma correction 605 as well to generate CMYK data in consideration of the human visual characteristic better. Also, in general, gamma correction is sometimes used to enhance a dark or bright portion of an image, and the gamma correction 605 can also be used for such an application purpose.

Up to the gamma correction 605, the CMYK data is managed as digital data by values of 0 to 1023. However, when actually printing by the printer 114, only two types of values including "eject ink" and "not eject ink" can be selected. Some printers have variations such as "eject ink a little" and "eject more ink" in addition to the above-described two types of values. However, the number is much smaller than the 1024 levels in digital data. Hence, the printer expresses a shade by forming "regions to eject ink" and "regions not to eject ink" representing coarse and fine patterns in a very small region imperceivable to the human eye. Processing of generating the "regions to eject ink" and the "regions not to eject ink" as digital data is the halftoning 606. In this embodiment, only two values "eject" and "not eject" are handled. Halftoning processing is a widely known technique, and a dither method, an error diffusion method, and the like exist.

A problem of halftoning processing is, for example, "thin line processing". The user can uniquely describe thin line processing by changing the halftoning 606. "Thin line" indicates a thin line, which often appears when printing a design of a building. In the halftoning 606, regions are divided into two types "eject" and "not eject". Hence, if a midpoint of a thin line is determined as "not eject", the line is interrupted. To prevent this, if a thin line exists, adjustment needs to be performed not to divide the line halfway.

Here, in the print data generation framework 600, the input image 601 is analyzed by the data analysis 602, and the result is stored in the RAM 103. Also, thin line detection is performed by the data analysis 602. To detect a thin line, for example, a technique such as edge detection is used. If an edge is detected, as described above, the determination is rewritten to "eject" such that no interruption occurs halfway concerning the portion of the edge.

In this way, the analysis result of the data analysis 602 can be reflected on the subsequent processing block, and processing that can use the analysis result is not limited to halftoning processing, as a matter of course.

As described above, the user modifies arbitrary processing of the blocks 501 to 506 on the main flow screen 500 and then presses the execution button 507. Thus, print data generation processing in step S304 of FIG. 3 is started. The print data generation framework 600 thus generates print data. The processing blocks 607 and 608 of the processing block group 611, which are executed by the print data generation framework 600, will be described next.

The result generated by the halftoning 606 is binary information including "eject" and "not eject" for each of the CMYK data, and the image format is as follows.

```
image = {
    width: the width of the image
    height: the height of the image
    channels: 4    // CMYK
    depth: 1       // 1 bit representing "eject" or "not eject"
    data: image data // uint8array( )
    colorSpace: "none"
}
```

Here, compression is performed data. Till this point, A 16-bit area is allocated, and processing is performed at an operation accuracy of 10 bits. After the halftoning 606, the information can be expressed by 1 bit.

Figure 8:
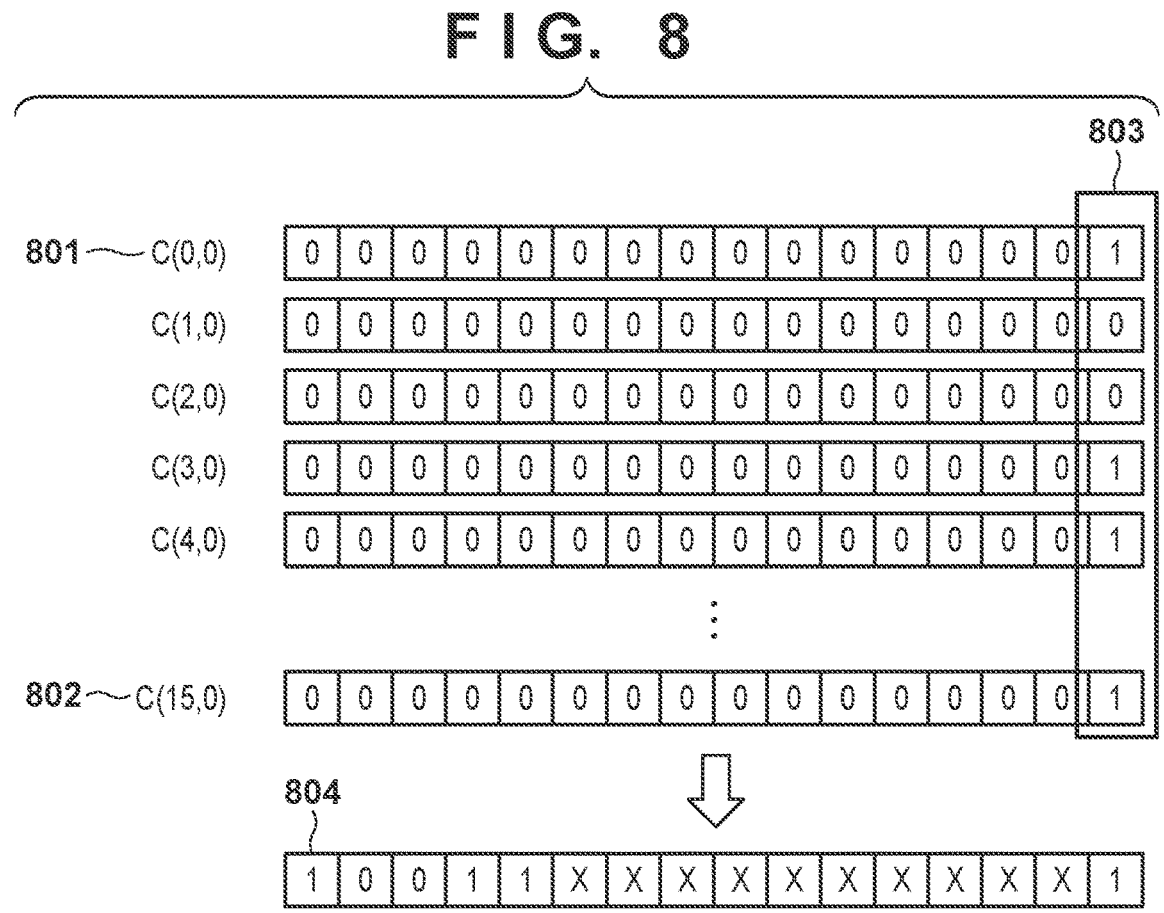
FIG. 8 is a view for explaining data compression of cyan (C) data by bit shift.

FIG. 8 is a view for explaining data compression of cyan (C) data by bit shift.

Reference numeral 801 in FIG. 8 denotes data after halftoning processing whose x- and y-coordinates are (0, 0). Similarly, reference numeral 802 denotes data after halftoning processing whose x- and y-coordinates are (15, 0). These data can be expressed by 1 bit, as indicated by reference numeral 803, and using the 16-bit area wastes the resource. If the data are packed and regenerated, the data can be compressed.

In addition, as a characteristic of image data, a pixel has a pixel value close to that of a pixel nearby. That is, identical values continue in many cases, and data can be expected to be further compressed using a compression algorithm such as run-length compression or Huffman coding in addition to the above-described compression. Reference numeral 804 denotes a "shift compression" result obtaining by performing processing of packing bits by a shift operation. Note that the compression processing is executed after the image format is separated to CMYK, and the following four images after compression are transmitted to the endian processing 608.

```
imageC = {
    width: the width of the image
    height: the height of the image
    channels: 1    // C
    depth: 1       // 1 bit.
    data: image data // uint16Array( )
    colorSpace: "none"
}
imageM = {
    width: the width of the image
    height: the height of the image
    channels: 1    // M
    depth: 1       // 1 bit.
      data: image data   // uint16Array( )
    colorSpace: "none"
}
imageY = {
    width: the width of the image
    height: the height of the image
    channels: 1    // Y
    depth: 1       // 1 bit.
    data: image data   // uint16Array( )
    colorSpace: "none"
}
imageK = {
    width: the width of the image
    height: the height of the image
```

-continued

```
    channels: 1    // K
    depth: 1       // 1 bit.
    data: image data   // uint16Array( )
    colorSpace: "none"
}
```

In the endian processing 608, endian means the order of data arrangement in unit of 8 bits (1 byte), and there exist big endian, little endian, and the like. The method to be employed changes depending on the CPU. If the endian changes, the arrangement of bytes needs to be changed to keep the consistency of data. This is performed by the endian processing 608.

Information necessary for the endian processing 608 includes the endian method of the information processing apparatus 100 and the endian method of the printer 114 that is the print data transmission target. Hence, the information processing apparatus 100 inquires of the printer 114 about the information about the endian method. If the thus received endian method is different from the endian method of the information processing apparatus 100, the endian processing 608 is executed. However, if the endian method is the same, the endian processing 608 may be skipped.

Referring back to FIG. 3, if print data is generated in step S304, the process advances to step S305 to transmit the print data to the printer 114. This corresponds to the print data transmission 609 in FIG. 6.

In the embodiment, the information processing apparatus 100 requests information unique to the printer 114 from the printer 114. Since the type of request is included in the transmission data, the printer 114 can correctly respond. If a print start instruction to the printer 114 according to this embodiment uses the POST method of http communication, and the entity of print data uses a data format 900, the printer 114 can start print processing.

FIG. 9 is a view for explaining the data format of print data transmitted from the information processing apparatus 100 according to the embodiment to the printer 114.

Here, reference numeral 901 denotes an address in the data format, and 902, the number of bytes stored in the address 901. Reference numeral 903 denotes a type of compression. Here, "shift compression" means processing of packing bits by a shift operation as indicated by the reference numeral 804 in FIG. 8.

If the value at the top of the entity of data sent by the POST method of http communication is "0xa", the printer 114 starts printing.

In an actual operation, the information processing apparatus 100 preferably asks the printer 114 whether it is in a printable state, and transmits data if the printer is in a printable state. If the printer 114 is executing some printing and cannot accept new data, a notification is made on the UI. Alternatively, the information processing apparatus 100 may hold data in the RAM 103 or the secondary storage device 105 until the printer 114 transitions to a state in which data can be accepted, and automatically start data transmission at a timing at which it comes possible to accept new data.

Also, the data format 900 holds the CMYK data on a plane basis, as indicated by reference numerals 906 to 909, but may hold CMYK data on a row basis.

FIG. 10 is a view for explaining another data format of print data transmitted from the information processing apparatus 100 according to the embodiment to the printer 114.

A data format used to transmit data on a row basis from the information processing apparatus 100 to the printer 114 is shown here.

If a data format 910 capable of transmitting data on a row basis is used, the printer 114 can start printing without waiting for reception of all data. In addition, since the capacity of the buffer used to hold data in the printer 114 can be small, the cost of the printer is expected to be low.

The operation of the information processing apparatus 100 has been described above.

After the information processing apparatus 100 transmits data to the printer 114, in the printer 114, the main control unit 211 of the image processing device receives the data via the external I/F 216. If the received data is data that can directly be transmitted to the recording device 201 and printed, image processing by the image processing unit 219 is not executed, and the data is transmitted to the recording device 201 via the image processing device I/F 212. For example, if certain processing such as data decoding is necessary, the image processing is executed by the image processing unit 219, and the processed data is then transmitted to the recording device 201.

Also, the print data generation framework 600 provides a means for memory allocation and memory release in addition to processing logic modification. Normally, a program dynamically allocates a memory by a malloc function in the C programming language independently of an area allocated in advance. Even in the print data generation framework 600, dynamic memory allocation and release during program execution exist. If the memory is allocated using WASM, it needs to be released.

In JavaScript, since garbage collection is implemented, memory release is unnecessary. In WASM, the memory needs to be manually released. However, since a JavaScript users tend not to be cognizant of memory release, it is easy to envision memory release being forgotten, which may cause an unexpected bug. Hence, the print data generation framework 600 needs to provide a means for guaranteeing memory allocation and memory release.

After the print data transmission 609, if there exists a memory that is allocated but not released yet, the print data generation framework 600 performs memory release on behalf of the user. The means for memory allocation and memory release is used in a situation where, for example, the user describes a logic using WASM, and the logic is executed from JavaScript.

As described above, according to the embodiment, at least a part of the print data generation logic for generating print data linked with a printer that executes printing is modified to a specification intended by the user, thereby generating print data. Thus, while suppressing matters of concern in the script language, generation of print data to be printed by the printer can dynamically be modified on the information processing apparatus side, and print data can be generated in a state in which the original print data generation processing can also be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-189621, filed Nov. 22, 2021, which is hereby incorporated by reference herein in its entirety.

What is claimed is:

1. A control method for controlling an information processing apparatus configured to generate print data using a first program described by JavaScript and a second program described by WebAssembly, comprising:
   acquiring the second program in which a first generation logic configured to execute a generation processing, which is to be executed in a printer outside the information apparatus for generating print data, in the information processing apparatus is described, the first generation logic being modifiable and linked with the printer;
   generating a second generation logic by modifying the first generation logic, described by the acquired second program, at least partially, the generation processing executed in the information processing apparatus being modified according to the modifying the first generation logic;
   generating print data to be printed by the printer using input image data and the second generation logic; and
   transmitting, to the printer, the print data generated in the generating the print data,
   wherein the first generation logic is executed using the second program.

2. The method according to claim 1, wherein in the generating the second generation logic, processing blocks included in the first generation logic are displayed, and a processing block selected by a user from the displayed processing blocks is modified.

3. The method according to claim 2, wherein in the generating the second generation logic, the second generation logic is generated by directly editing the selected processing block of the first generation logic, modifying the selected processing block using a preset generation logic, or inputting an external file for defining a processing logic and modifying the selected processing block.

4. The method according to claim 2, further comprising confirming whether the selected processing block modified in the generating the second generation logic can be adapted.

5. The method according to claim 1, wherein modification in the generating the second generation logic includes modifying an operation accuracy of a pixel value of the image data, or modifying consumption of a recording material in the printer.

6. The method according to claim 1, wherein in the acquiring, the first generation logic is acquired from the printer or a server.

7. The method according to claim 1, wherein the generating the print data includes data compression of the image data.

8. The method according to claim 7, wherein the data compression is executed using the second program.

9. The method according to claim 1, wherein in the generating the print data, endian processing according to the printer is executed, thereby generating the print data.

10. The method according to claim 9, wherein in the generating the print data, a method of the endian processing is acquired from the printer, and endian processing according to the printer is executed based on the acquired method.

11. The method according to claim 1, wherein the generating the print data includes allocating a memory to be used to generate the print data and release the memory.

12. An information processing apparatus configured to generate print data using a first program described by JavaScript and a second program described by WebAssembly, the information processing apparatus comprising a processor and a memory storing a program to execute:
acquiring the second program in which a first generation logic configured to execute a generation processing, which is to be executed in a printer outside the information apparatus for generating print data, in the information processing apparatus is described, the first generation logic being modifiable and linked with the printer;
generating a second generation logic by modifying the first generation logic, described by the acquired second program, at least partially, the generation processing executed in the information processing apparatus being modified according to the modifying the first generation logic;
generating print data to be printed by the printer using input image data and the second generation logic; and
transmitting, to the printer, the generated print data,
wherein the first generation logic is executed using the second program.

13. A non-transitory computer-readable storage medium storing a program configured to cause a computer to execute a control method for controlling an information processing apparatus configured to generate print data using a first program described by JavaScript and a second program described by WebAssembly, the control program comprising code to execute:
acquiring the second program in which a first generation logic configured to execute a generation processing, which is to be executed in a printer outside the information apparatus for generating print data, in the information processing apparatus is described, the first generation logic being modifiable and linked with the printer;
generating a second generation logic by modifying the first generation logic, described by the acquired second program, at least partially, the generation processing executed in the information processing apparatus being modified according to the modifying the first generation logic;
generating print data to be printed by the printer using input image data and the second generation logic; and
transmitting, to the printer, the print data generated in the generating the print data,
wherein the first generation logic is executed using the second program.

* * * * *